(12) United States Patent
Hueppauff et al.

(10) Patent No.: US 8,098,173 B2
(45) Date of Patent: Jan. 17, 2012

(54) PARKING APPARATUS

(75) Inventors: Martin Hueppauff, Stuttgart (DE);
Christian Danz, Kleinmachnow (DE);
Werner Uhler, Bruchsal (DE); Michael Seiter, Eberdingen-Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 546 days.

(21) Appl. No.: 11/989,683

(22) PCT Filed: Jun. 6, 2006

(86) PCT No.: PCT/EP2006/062942
§ 371 (c)(1),
(2), (4) Date: May 20, 2009

(87) PCT Pub. No.: WO2007/012516
PCT Pub. Date: Feb. 1, 2007

(65) Prior Publication Data
US 2010/0013670 A1 Jan. 21, 2010

(30) Foreign Application Priority Data
Jul. 26, 2005 (DE) .......................... 10 2005 034 700

(51) Int. Cl.
*B60Q 1/48* (2006.01)
*G08G 1/14* (2006.01)
*H04N 7/18* (2006.01)
*G06K 9/00* (2006.01)

(52) U.S. Cl. .................. 340/932.2; 340/425.5; 340/958; 382/104; 348/135; 348/148; 701/1

(58) Field of Classification Search ................. 340/932.2
See application file for complete search history.

(56) References Cited

U.S. PATENT DOCUMENTS

| | | | |
|---|---|---|---|
| 6,654,670 B2 * | 11/2003 | Kakinami et al. | 701/1 |
| 7,295,227 B1 * | 11/2007 | Asahi et al. | 348/118 |
| 2001/0030688 A1 | 10/2001 | Asahi et al. | |
| 2006/0080005 A1 | 4/2006 | Lee et al. | |

FOREIGN PATENT DOCUMENTS

| | | |
|---|---|---|
| DE | 100 65 327 | 8/2001 |
| EP | 1 288 071 | 3/2003 |
| EP | 1 642 768 | 4/2006 |
| JP | 2001-180405 | 7/2001 |
| JP | 2001-322520 | 11/2001 |
| JP | 2002-354467 | 12/2002 |
| JP | 2003-226212 | 8/2003 |
| JP | 2004-114879 | 4/2004 |
| JP | 2005-132170 | 5/2005 |

OTHER PUBLICATIONS

International Search Report, PCT International Patent Application No. PCT/EP2006/062942, dated Aug. 24, 2006.

* cited by examiner

*Primary Examiner* — Donnie Crosland
(74) *Attorney, Agent, or Firm* — Kenyon & Kenyon LLP

(57) ABSTRACT

In a parking apparatus for a vehicle, a parking space is measured and a parking trajectory into the parking space is determined by using this apparatus. A driving space for the vehicle is captured by a camera, both the parking trajectory and a turning point situated on the parking trajectory being superimposed on the camera image.

16 Claims, 3 Drawing Sheets

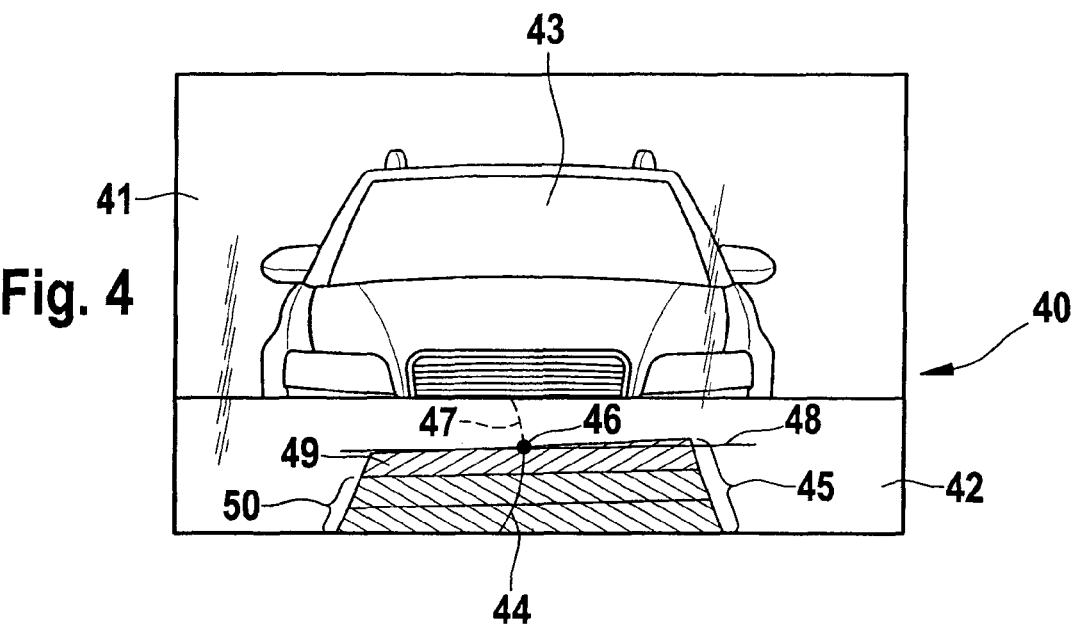
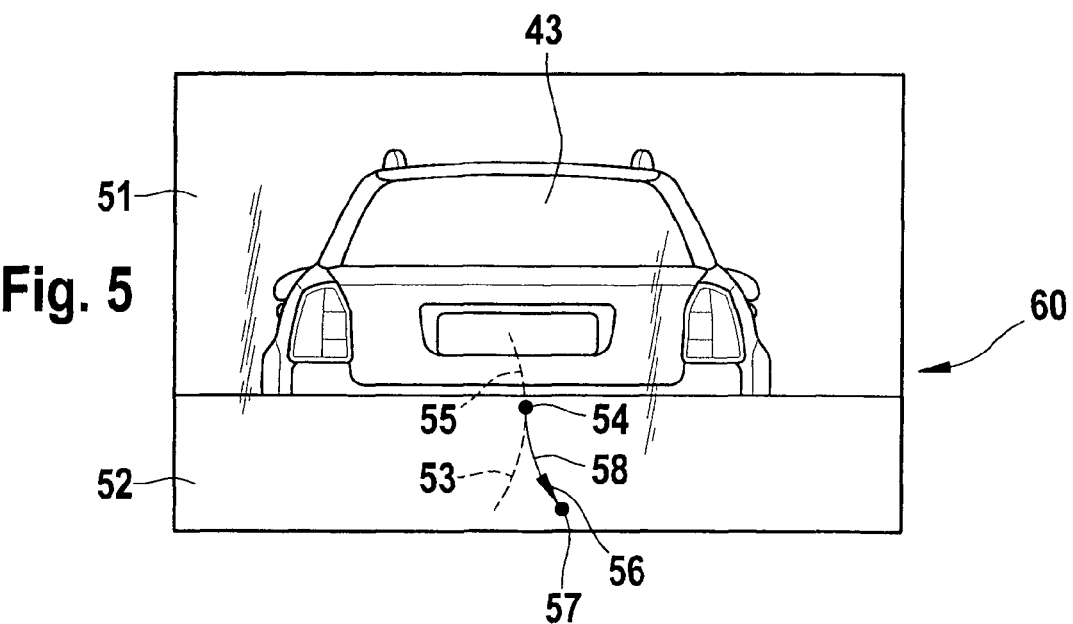

PARKING APPARATUS

FIELD OF THE INVENTION

The present invention is directed to a parking apparatus.

BACKGROUND INFORMATION

A steering aid apparatus is described in German Published Patent Application No. 100 65 327 A1; with this apparatus a steering measure guidance mark, a target parking space and a location line corresponding to a location characteristic of the vehicle from the current position into the target parking position are depicted on a display. A camera is provided here to record the images of a section facing backward in front of a vehicle. In the display, the location line is entered into the display image as a steering measure guidance line.

Likewise, a movement guidance display is also provided, defining a steering angle. Furthermore, vehicle width guidance lines are provided, to be used to predict the positions of the two side sections of the vehicle in the case of backing up in a straight line. From the corresponding orientation of the location characteristic, the movement guidance display and the vehicle width guidance lines, the vehicle driver is able to guide the vehicle from the current position into the parking space.

SUMMARY

The parking apparatus according to example embodiments of the present invention provides that turning points are superimposed on a camera image such that they stand out in comparison with the remaining parking trajectory. In general, during a parking maneuver, it is necessary for the steering of the vehicle to be turned in a certain manner to position the vehicle in the desired parking position. It may even be necessary to park in multiple maneuvers by not only steering the vehicle but also moving it back and forth several times in the driving direction. The turning point should be understood here to refer to the point on a parking trajectory at which the driver modifies the steering angle of the vehicle currently selected. For example, at a turning point it is possible to change from a full lock to the left to a full lock to the right. However, other changes in wheel angle are also possible with a smaller change in steering angle. The turning point here is understood to refer to an area on the parking trajectory within which the driver may perform a corresponding steering correction. Since it is impossible to stop the vehicle precisely at a single defined location, the size of the turning point has been extended spatially here and has also been taken into account through the tolerances of the distance and steering angle determination and the measurement error in the parking space measurement. If necessary, an additional tolerance may also be included, making it easy for a driver to stop within a corresponding larger area or to decelerate the vehicle accordingly to execute the steering maneuver.

The driver is able to recognize very easily and very quickly which distances he may travel rapidly with an unchanged steering angle while on the other hand also recognizing at what points he must decelerate the vehicle to be able to execute a change in steering angle which is indicated accordingly and/or is discernible from the parking trajectory displayed in that the turning points are superimposed separately onto a parking trajectory, i.e., the parking pathway from the vehicle's current position to a desired parking position, in the display.

It is possible to superimpose a symbolic representation on the display during the parking maneuver, illustrating the approach to the turning point. In this manner, the driver is able to recognize the distance between his vehicle and the upcoming turning point. The driver may then decelerate his vehicle accordingly, so that it comes to a standstill at the turning point or is at least decelerated to the extent that he is able to perform the turning maneuver without deviating from the parking trajectory.

The approach to the turning point may be identified by color according to the distance from the turning point. Furthermore, it is particularly easily discernible to use a rolling bar diagram to illustrate the progress on the parking trajectory and the approach to a turning point. To increase recognizability for the driver with respect to the actual scene, the rolling bars may be superimposed in a perspective view on the display image so that they appear to the driver as if painted on the road.

Furthermore, it may be provided on reaching a turning point to output steering instructions to the driver visually and/or acoustically. He may then turn the steering according to the steering instructions.

Furthermore, it may be provided to enter the current steering angle into the display. In this manner, the driver is able to make the prevailing steering angle coincide with the parking trajectory at the turning point to steer the vehicle into the parking space.

Furthermore, it is possible to provide, in addition to a camera display, an area in the display where the parking trajectory and, if necessary, also at least one turning point are depicted when the turning point is situated such that it is outside of the visible range of the camera. The turning point may be such a distance away from the vehicle that it no longer appears in the camera image. In particular, however, it may be provided to select a display representation for a display of a turning point that is so close to the vehicle that it is no longer included in the camera image. This may be the case in particular with very narrow parking spaces in which the driver must approach very close to an obstacle in order to reach the desired parking space position.

In addition, it may be provided to also give the driver instructions for driving forward in the display of the back-up camera by superimposing turning points in the display in a suitable calculated representation in the case of driving forward. In particular, this image is superimposed in a border area of the display, where a depicted parking trajectory is continued into the border area in that a calculated image is shown instead of a camera image. In this manner, the driver may also be assisted with parking that involves several maneuvers and also requires driving forward. In particular, corresponding turning points may easily be provided to the driver for driving straight ahead.

Exemplary embodiments of the present invention are illustrated in the drawings and explained in greater detail in the following description.

BRIEF DESCRIPTION OF THE DRAWINGS

FIGS. 2 through 5 show diagrams of a display for implementing a parking method according to an example embodiment of the present invention.

DETAILED DESCRIPTION

Figure 1:
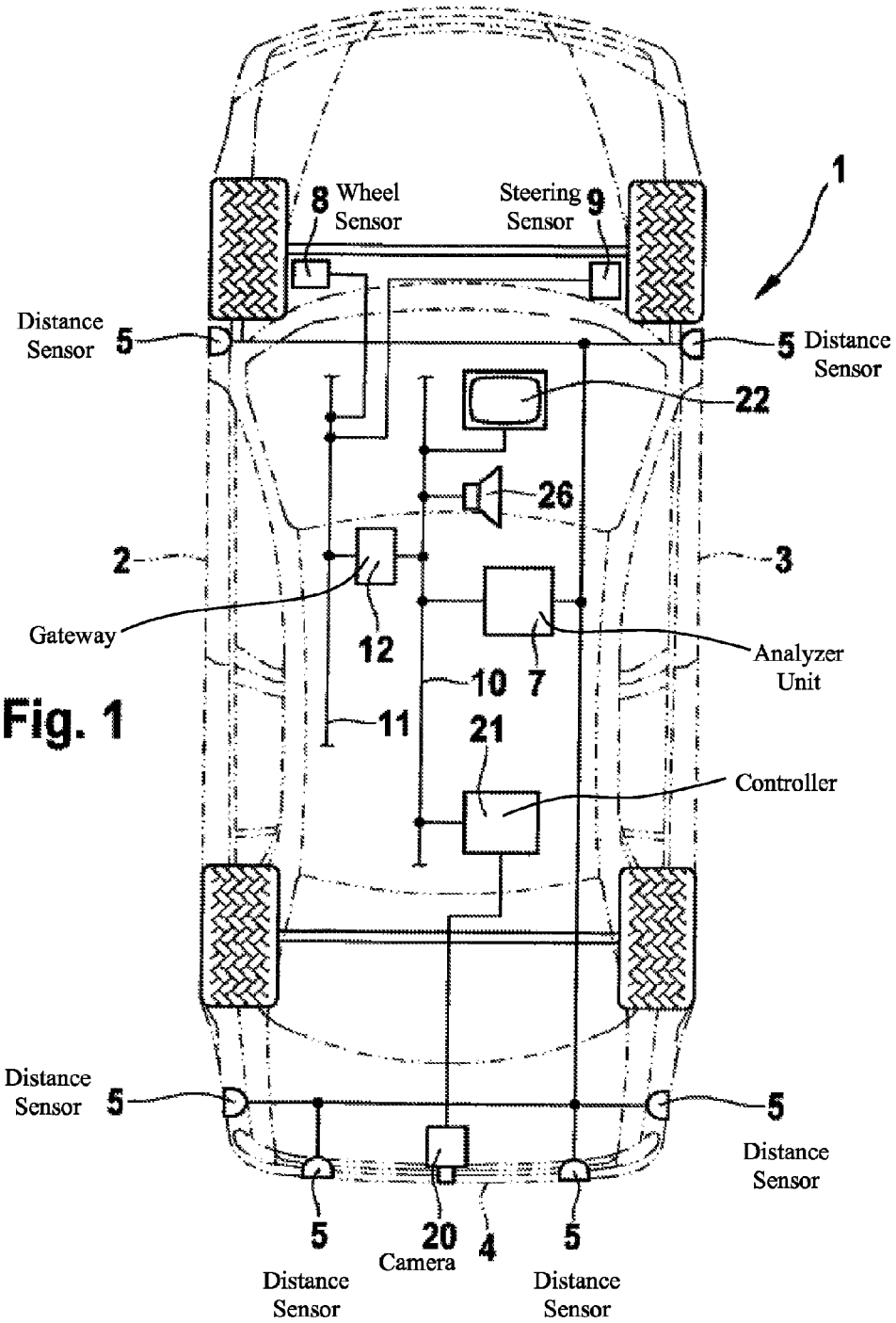
FIG. 1 shows a vehicle having a parking apparatus according to an example embodiment of the present invention.

FIG. 1 shows schematically a view of a vehicle 1, which has a parking apparatus according to an example embodiment of the present invention. Vehicle 1 has distance sensors 5 on a left vehicle side 2, on a right vehicle side 3 and on vehicle rear end 4, measuring the distance from an obstacle. Distance sensors 5 are may be arranged as ultrasonic sensors. Any other optical, capacitive or radar sensors may also be used. If ultrasonic sensors are used, a measurement is performed in that the distance sensors each emit a sonic signal, the sonic signal is reflected by an obstacle and a distance to the obstacle is determined from the measured transit time. With the exemplary embodiment shown, two distance sensors are situated on left side 2 and on right side 3. These distance sensors are used to measure the depth as well as the width of the parking space when driving past a suitable parking space which is aligned parallel to the direction of travel of the vehicle in particular. The measured distance data are relayed to an analyzer unit 7. The dimensions of vehicle 1 are stored in analyzer unit 7. A comparison of the measured parking space size with the dimensions of the vehicle reveals whether the vehicle will fit into the parking space. This requires a parking space that extends sufficiently beyond the vehicle in both width and length, so that the maneuvering distance from the obstacles bordering the parking space, including a safety margin, is sufficient for parking the vehicle. When a suitable parking space is found, the driver may initiate the parking maneuver via an operator unit.

While driving past the parking space, the distance traveled by vehicle 1 with respect to the parking space was recorded, preferably via one (or more) wheel sensor(s) 8 and, if necessary, also via a steering angle sensor 9. Wheel sensor 8 and steering angle sensor 9 may be connected to a data bus 11, e.g., a CAN bus, by which other vehicle data, in particular drive train information, are transmitted, e.g., via another control unit. Data bus 11 is preferably connected via a gateway 12 to a data bus 10 to which analyzer 7 is also connected. The distance traveled is determined from the wheel sensor data. The steering angle selected is available via the steering angle sensor. Analyzer unit 7 may then determine the position of the vehicle with respect to the parking space from the measured distance data on the one hand and from the vehicle distance data on the other hand. Analyzer unit 7 then also calculates a parking trajectory which leads into the measured parking space, starting from the vehicle's current position. The parking assistance may be activated by engaging the reverse gear, for example.

Figure 2:
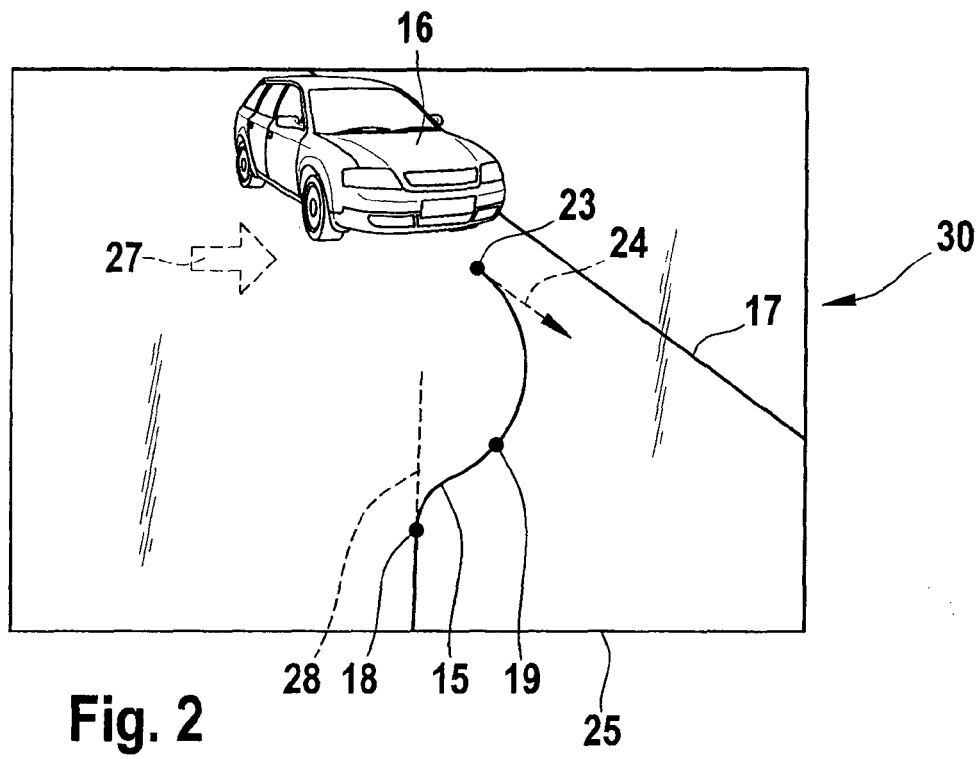

If the user has activated the parking maneuver, a camera 20 mounted on rear end 4 of the vehicle is activated. Camera 20 captures an image which is relayed to a controller 21 and from there to data bus 10. The image of the rear driving space of the vehicle recorded by camera 20 is relayed via data bus 10 to a display 22. The driver may then recognize a rear view of the space behind the vehicle in display 22. A representation of the parking trajectory is determined by analyzer unit 7, projected into the camera image and also depicted on display 22. FIG. 2 shows as an example a representation of a parking trajectory 15, which leads from the vehicle's current position to a parking position in front of another vehicle 16, which is parked on a roadside 17 according to the camera image display in FIG. 2. The driver of vehicle 1 must then set the steering for driving in reverse, so that the vehicle is guided along parking trajectory 15. As an example of the parking trajectory, in FIG. 2 the position of the center of the rear axle of vehicle 1 is selected as a reference point for the parking trajectory. A movement path from one or two side borders of vehicle 1 may also be shown in display 22 to show the driver the parking trajectory. Instead of the position of the center of the rear axle, a position in the center of the bumper of the vehicle or a virtual position may also be used as the basis for the path of the parking trajectory and thus for the arrangement of turning points on the parking trajectory. For example, a point plotted on the ground 10 cm behind the vehicle may be defined by the parking apparatus as the point along which the parking trajectory is guided. If this point coincides with a turning point, the driver may execute a turn.

The parking trajectory may be composed such that areas where the wheel angle is different are linked together. Within the individual area of a wheel angle, the particular wheel angle is constant, however. If a driver follows the parking trajectory, he may not have to be constantly changing the steering but instead will be able to drive along the areas of a constant wheel angle without any change in steering. FIG. 2 shows a first turning point 18 and a second turning point 19 between the areas of a constant wheel angle. First, the vehicle is to be backed up in a straight line to first turning point 18. Thereafter it is to be turned to the left and backed up in accordance with the turn to the left until reaching second turning point 19. The vehicle's turning angle is then to be modified to the right so that the vehicle is steered back to a third turning point 23. In an example embodiment, the steering may then be set to a straight-ahead position at third turning point 23 to then leave the vehicle unchanged in this position. However, if it is necessary to drive even further into an even tighter parking space, if necessary, the parking maneuver may be continued by driving the vehicle forward and in reverse, as indicated by arrow 24, from here on in conjunction with a corresponding change in steering.

Calculation of the setpoint trajectory is not limited to the fact that the driver turns the vehicle only when stationary. Such parking trajectories that maintain continuous turning while driving and/or work only with partial turns of the steering may also be calculated. In this case, if the driver deviates from the corresponding trajectory, the wheel angle may have to be corrected, if necessary. In this case, a turning point which has become necessary due to the deviation while driving along the parking trajectory may also be depicted to give the driver an opportunity to readjust the steering accordingly. In such a case, the areas between the depicted steering angle selected and the setpoint trajectory may flash to instruct the driver that a deviation has occurred.

In the exemplary embodiment shown in FIG. 2, the turning points are superimposed on the camera image by showing the parking trajectory in bold, which is indicated here with a circle. Accordingly it is also possible, in particular for identifying a larger turn area, to superimpose an elliptical embodiment of a turning point onto the path of the parking trajectory. When approaching the representation of the turning point at a lower edge 25 of display surface 30, the driver recognizes that a turn must be executed. In a first embodiment, a corresponding steering instruction may be output to the driver over a loudspeaker 26. Loudspeaker 26 is preferably connected to data bus 10 and is triggered by analyzer unit 7. In an example embodiment, a steering signal, e.g., a corresponding arrow display 27 (shown with dashed lines in FIG. 2 only as an example), may also be superimposed on display surface 30.

In an example embodiment, another characteristic of the route of the vehicle is projected onto display surface 30 with the steering angle set currently. In the representation according to FIG. 2, the vehicle is being driven in reverse, so that a representation of the expected vehicle movement in the case of an unchanged steering angle according to dashed-line representation 28 would be expected. The steering is to be turned at the turning point, so that the expected steering setting now coincides with the path of the planned parking trajectory up to the next turning point. At the next turning point the next correction may then be performed.

If the driver has overshot a corresponding turning point or if an obstacle has suddenly moved into the space behind the vehicle, the distance sensors situated on rear end 4 are then used in particular to warn the driver, if necessary, by an acoustic signal over a loudspeaker 26, of an imminent collision when the vehicle is being backed up. If acoustic instructions to stop at the turning point or to turn the steering are issued to the driver, these instructions preferably differ from warnings of an imminent collision with an obstacle. The driver is able in this manner to clearly differentiate the corresponding, particularly relevant distance warnings from the assistance instructions.

Figure 3:
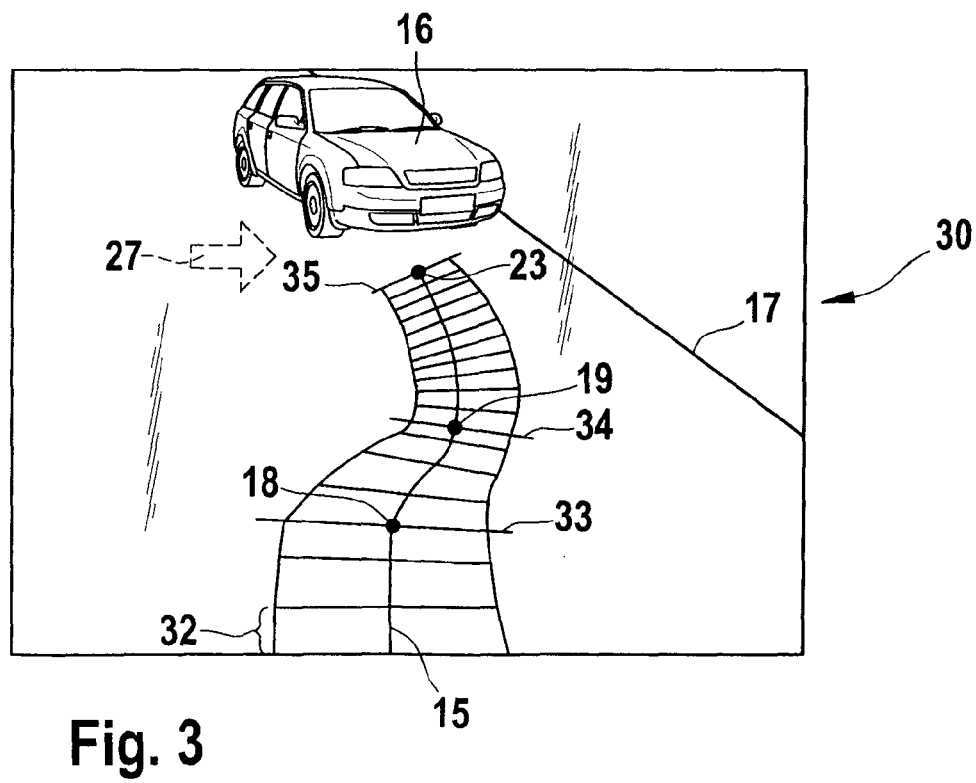

FIG. 3 shows another exemplary embodiment of a representation of a parking trajectory. Bar diagrams 32 have been plotted all around parking trajectory 15, in particular according to the width of the vehicle. The bar diagrams are preferably selected in length according to the parking trajectory, so that they describe equidistant path intervals along the parking trajectory. A roller bar may be designed so that the driving segment is subdivided by crossbars into individual intervals as equidistant as possible, the position of each perpendicular to the parking trajectory. On the basis of the subdivision by bars 32, the driver may then recognize which distance he has yet to travel up to the turning point when driving along the parking trajectory. For ease of comprehension, only one bar having a reference numeral 32 has been shown here. Likewise, in this representation it may be provided to also identify the turning point by using a line 33, 34 and/or 35 which is perpendicular to the parking trajectory at the turning point. In this manner, it is possible to estimate the position of the turning point especially well.

With an approach to the turning point, the individual bars may also be shown in color. For example, the last bar before the turning point may be shown in red, two bars before that in yellow and all other bars in green. The driver is then able to recognize especially well when he must stop the vehicle in order to perform the turning maneuver.

The camera of the vehicle is mounted in the area of a vehicle bumper, for example, or in the area of the trunk. However, it may also be mounted in an area above the rear window. Depending on the arrangement of the camera as well as the arrangement of the angle of view of the camera, it is possible that the entire area of the vehicle may not be visually displayable. For example, it is possible that an area directly behind the vehicle may be covered by the bumper or the trunk of the vehicle. The area directly in front of the vehicle therefore cannot be seen. To be able to display to the driver in the near range when the vehicle is approaching a turning point, a first area 41 and a second area 42 are therefore provided in display surface 40 according to FIG. 4. In first area 41 there is an actual representation of the camera image recorded, a vehicle 43 being visible in the exemplary embodiment shown here. Second area 42 shows a purely calculated representation, namely representing a parking trajectory 44, a bar diagram 45 and turning point 46 and also representing selected steering angle 47, if applicable. The representation of the turning point is supported by a corresponding mark 48. A first bar 49 is shown in red, while other bars 50 are shown in yellow to illustrate an approach to turning point 46. In the exemplary embodiment shown, the vehicle is backed up as far as turning point 46, then the steering is turned accordingly to allow a correction to be performed, if necessary, by driving forward. If necessary, turning points and/or trajectory areas that are too far away from the vehicle may also be represented based on calculations in the upper area of the display.

FIG. 5 shows another exemplary embodiment of a display surface 60. In contrast with FIGS. 2 through 4, which show a rear driving space of the vehicle for driving in reverse, with display surface 60, driving forward, which is required for the parking maneuver, is to be facilitated for the driver. Such forward driving is required in particular for parking in multiple maneuvers. If the parking space is so tight that parking in one maneuver is impossible, then it is also beneficial for the vehicle to be driven forward in a targeted manner to reach a desired parking position with the least possible effort. If the rear driving space is shown in the display, this representation ends at the lower edge with the vehicle's bumper. This representation corresponds to a first upper display area 51 in FIG. 5. If the vehicle is to be driven forward during the parking maneuver, e.g., if the driver has reached a corresponding turning point 54 and/or if the driver has engaged the forward gear, then in addition a second display area 52 is superimposed beneath the first area. Second display area 52 includes an environment not captured by the camera and thus a calculated representation of a parking trajectory 58 which extends forward and therefore from the bumper into the interior of vehicle 1. Driving forward may be indicated separately by an arrow 56. Another turning point 57 is plotted on parking trajectory 58. Likewise, the steering angle currently set may be entered via driving path 53 to be expected when driving forward, as represented by a broken line in FIG. 5. In addition, driving path 55 may also be diagrammed when driving further in reverse.

In the representation of the turning points, it is possible to differentiate between turning points at which only the steering direction is changed and between turning points at which there is also a change in the direction of driving, i.e., reverse and/or forward. A differentiation is possible by using different colors, for example, for different types of turning points in the display.

In an example embodiment, second display area 52 may also always be reserved in the display. If there is no forward driving, it is used, if provided, either for the example embodiment of the representation according to FIG. 4, or text messages, e.g., with warnings or driving instructions, may be output in second display area 52.

In an example embodiment, it is also possible for an image representation to completely turn off a camera for monitoring the rear driving space while driving forward.

Like the recorded image of a rear space of the vehicle using a camera, the space in front of the vehicle may also be monitored with another camera accordingly and a trajectory may be plotted in the camera image in the same manner. This makes it possible to provide the driver with uniform assistance for both driving in reverse and driving forward.

What is claimed is:

1. A parking apparatus for a vehicle, comprising:
 a measurement device configured to measure a parking space;
 a computation unit configured to calculate a parking trajectory into the parking space;
 a camera configured to capture a driving space of the vehicle; and
 a display configured to represent a camera image, the parking trajectory being superimposed on the camera image;
 wherein at least one turning point situated on the parking trajectory is superimposed on the camera image.

2. The parking apparatus according to claim 1, further comprising a steering angle sensor configured to detect a set steering angle and a path detection unit configured to measure a path traveled, a symbolic representation being superimposed on the camera image during a parking maneuver to represent an approach to the turning point.

3. The parking apparatus according to claim 2, wherein a color of symbols of the symbolic representation is altered with a progressive approach to the turning point.

4. The parking apparatus according to claim 2, wherein an approach to a turning point is displayed as a bar diagram.

5. The parking apparatus according to claim 4, wherein the bar diagram is displayed such that bars are projected in perspective onto a driving path.

6. The parking apparatus according to claim 1, wherein a steering instruction is output on reaching a turning point.

7. The parking apparatus according to claim 1, wherein a path characteristic of the vehicle is displayed on the display in the case of an unchanged steering angle as currently set.

8. The parking apparatus according to claim 1, wherein the camera monitors a rear driving space of the vehicle.

9. The parking apparatus according to claim 8, wherein a calculated parking trajectory and at least one turning point for driving the vehicle forward for a multi-maneuver parking maneuver are represented in the display.

10. The parking apparatus of claim 1, wherein a location of the at least one turning point is indicated on the display with a marker extending perpendicular to the parking trajectory.

11. The parking apparatus of claim 3, wherein the color of a symbol representing a location of the turning point is different from the colors of symbols representing locations of non-turning points.

12. The parking apparatus of claim 1, wherein:
the display is divided into a first area presenting the camera image and a second area representing a portion of the driving space that is not captured in the camera image; and
the display is configured to display the parking trajectory in the second area when the parking trajectory is located beyond a portion of the driving space captured in the camera image.

13. The parking apparatus of claim 12, wherein text messages are displayed in the second area when the second area is not being used for displaying the parking trajectory.

14. The parking apparatus of claim 1, wherein turning points on a forward parking trajectory are displayed in a different manner than turning points on a reverse parking trajectory.

15. A parking method for a vehicle, comprising:
measuring a parking space;
calculating a parking trajectory for parking the vehicle in the parking space;
recording a vehicle environment by a camera;
showing the vehicle environment in a display;
entering the parking trajectory into a camera image of the vehicle environment in the display; and
entering at least one turning point situated on the parking trajectory into the camera image in the display for instruction as to a required change in a set steering angle at the turning point.

16. The method according to claim 15, wherein a turning point situated outside of the camera image is shown in a calculated representation of an area of the vehicle environment belonging to the calculated representation in the display.

* * * * *